C. A. DOTSON.
LUBRICATOR.
APPLICATION FILED NOV. 28, 1908.
938,415.
Patented Oct. 26, 1909.
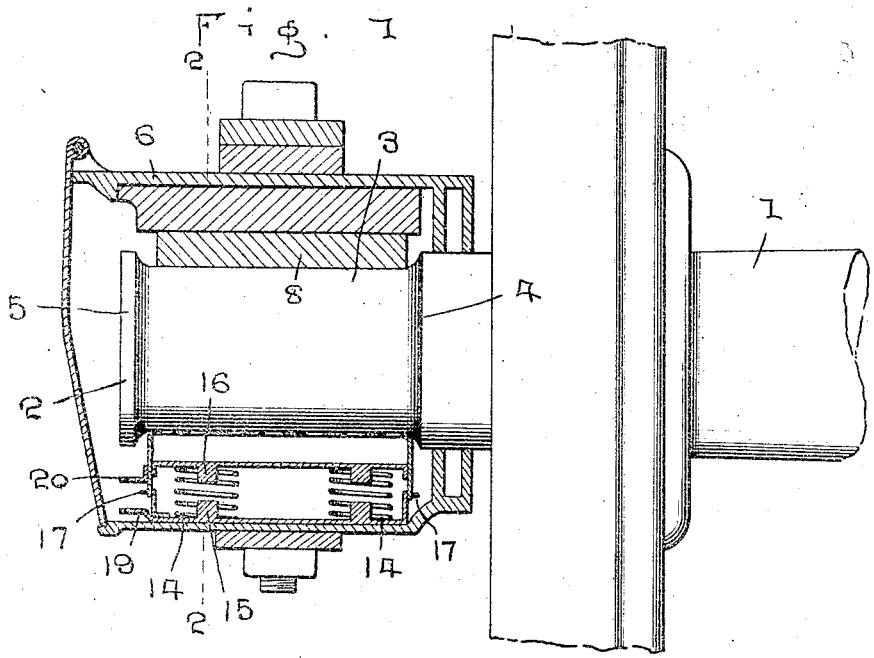
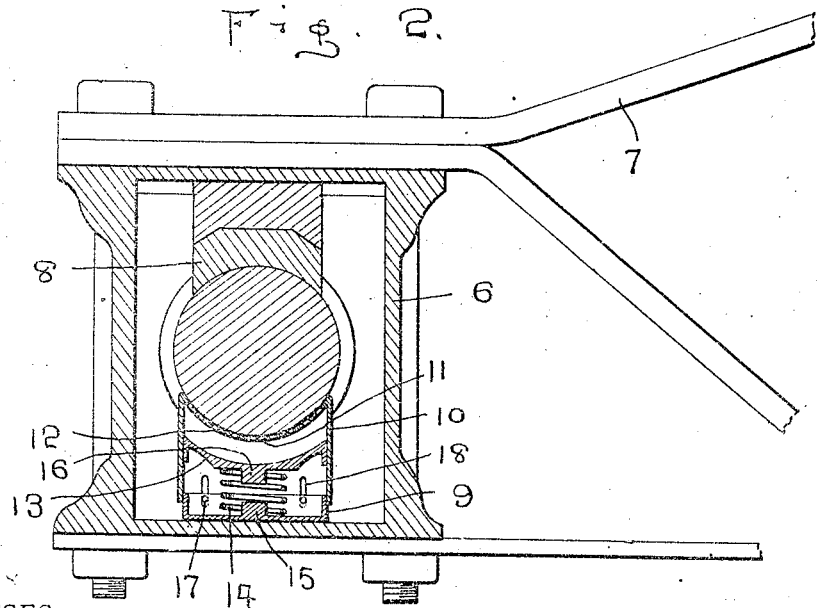
WITNESSES:
INVENTOR
C. A. Dotson
BY
W. J. Fitzgerald & Co.
Attorneys

UNITED STATES PATENT OFFICE.

CHARLEY ALLEN DOTSON, OF HUNTINGTON, WEST VIRGINIA, ASSIGNOR OF ONE-THIRD TO R. F. CARSON AND ONE-THIRD TO A. O. KIRSCHNER, BOTH OF HUNTINGTON, WEST VIRGINIA.

LUBRICATOR.

938,415.

Specification of Letters Patent. Patented Oct. 26, 1909.

Application filed November 28, 1908. Serial No. 464,868.

*To all whom it may concern:*

Be it known that I, CHARLEY A. DOTSON, a citizen of the United States, residing at Huntington, in the county of Cabell and State of West Virginia, have invented certain new and useful Improvements in Lubricators; and I do hereby declare the following to be a full, clear, and exact description of the invention, such as will enable others skilled in the art to which it appertains to make and use the same.

My invention relates to new and useful improvements in lubricators and more particularly to that class adapted to be used for lubricating the journals of railway trucks and my object is to provide a retaining means for the lubricant, whereby waste or the like usually employed for retaining the lubricant may be dispensed with.

A further object is to provide means for holding the lubricator in engagement with the bearing parts of the journal.

A further object is to provide means for gradually feeding the lubricant into engagement with the journal.

A still further object is to provide means for compressing the parts of the lubricant-holding device, whereby the same may be introduced into or removed from engagement with the journal and a still further object is to provide means for holding the parts of the lubricator against casual disengagement with each other.

Other objects and advantages will be hereinafter referred to and more particularly pointed out in the claim.

In the accompanying drawings which are made a part of this application, Figure 1 is an elevation of the bearing end of a car axle showing the usual form of housing and my improved lubricating device in section, and Fig. 2 is a transverse sectional view as seen on line 2—2, Fig. 1.

Referring to the drawings in which similar reference numerals designate corresponding parts throughout the several views, 1 indicates the usual or any preferred form of car axle, the bearing end 2 of which is provided with an annular channel 3, the end walls of the channel 3 forming shoulders 4 and 5 at the inner and outer ends, respectively, of the channel.

Surrounding the bearing end 2 of the axle is the usual or any preferred form of housing 6, to which is secured the usual form of car body-supporting frame 7 and in order to provide a frictional bearing surface between the housing and the axle, a bushing or bearing block 8 is introduced between the upper portion of the housing and the bearing end 2 of the axle.

In order to maintain a lubricant and gradually feed the same into engagement with the frictional surface of the axle 1 and at the same time dispense with waste, or the like, commonly employed for absorbing and retaining the lubricant in the housing, I have provided my improved form of lubricator which is preferably formed of metal and made in two sections 9 and 10, the section 9 resting upon the base of the housing 6, while the section 10 is of sufficient size to telescope around the section 9 and has its upper wall 11 curved to fit the contour of the bearing surface of the channel 3. The upper section 10 is adapted to receive and maintain the lubricant and as the lubricant is preferably reduced to a soluble state, it may be readily introduced into the section 10 and gradually fed into engagement with the surface of the channel 3 through a plurality of slits 12 formed in the curved upper wall 11. The lubricant is gradually fed through the slits 12 by means of a plunger 13, which plunger is introduced into the open end of the section 10 after the lubricant has been placed therein and directs pressure against the lubricant by introducing springs 14 between the floor of the section 9 and the lower face of the plunger 13, said springs being held in proper alinement by means of lugs 15 and 16, on the section 9 and plunger 13, respectively, and as the lubricant is consumed by the axle, the pressure of the springs will gradually force a new supply of the lubricant through the slits 12 and into engagement with the frictional surface of the channel 3, thereby keeping a constant supply of lubricant on the axle and at the same time limiting the supply to such an extent as to prevent wastage of the lubricant.

The sections 9 and 10 are held in telescopic relation with each other by means of pins 17 which are introduced through the overlapping end members of the two sections, the end members of the section 10 having elongated slots 18 therein to receive the pins, whereby the section 10 will be permitted to telescope with the section 9 and in introducing the lubricator in position below the bearing end of the axle, the section 10 is lowered a sufficient distance to permit the lubricator to pass between the base of the housing 6 and the shoulder 5 at the outer end of the channel 3 and as soon as the lubricator has been moved inwardly a sufficient distance, the tension of the springs 14 will move the curved upper wall 11 into engagement with the frictional surface of the channel 3, the shoulders 4 and 5 preventing undue longitudinal movement of the lubricator after the same is properly positioned.

In removing the lubricator from the housing 6, the forward end of the section 10 is sufficiently depressed to permit the lubricator to pass the shoulder 5 and in order to readily accomplish this result, I provide alining ears 19 and 20 on the front end walls of the sections 9 and 10 and by grasping said ears and moving the ear 20 toward the ear 19, the forward end of the section 10 will be lowered a sufficient distance to permit the same to clear the shoulder 5 when the lubricator is moved outwardly.

In introducing the lubricant into the section 10, the pins 17 are removed and the section 10 elevated from engagement with the section 9 when the plunger 13 is removed from the section 10 and the lubricant deposited on the curved upper wall 11. The plunger 13 is then again introduced into the section 10 and the section 10 placed in position over the section 9, when the pins are again introduced into position and the sections 9 and 10 held in coöperative relationship with each other.

In view of the simplicity of my improved lubricator, the same may be readily and cheaply constructed and used in connection with any suitable form of bearing surface, but particularly in connection with car axles and it will likewise be seen that the lubricant will be positively supplied to the bearing portion of the axle and at a degree to prevent wastage of the lubricant. It will further be seen that by the use of my improved lubricator, the usual form of waste employed for retaining the lubricant may be dispensed with, and that the lubricator may be quickly introduced into or removed from engagement with the axle and further that the supply of lubricant may be readily replenished at any time. It will likewise be seen that the tension of the springs will not only force the lubricant through the slits in the wall 11, but that the pressure employed for feeding the lubricant will also maintain the curved upper wall in engagement with the frictional surface of the channel 3.

What I claim is:

A device of the character described, comprising a lubricant holder formed of sections, a plunger arranged in the upper section and resilient members arranged intermediate of the bottom of the lower section and delivering their pressure upon said plunger, the upper plate portion of said upper section having numerous openings therethrough, said plunger and said upper plate portion being of concavo-convex outline, and said plunger delivering the lubricant through the openings of said plate portion, and said upper section telescoping around said lower section and connected thereto.

In testimony whereof I have signed my name to this specification in the presence of two subscribing witnesses.

CHARLEY ALLEN DOTSON.

Witnesses:
WILLIAM SIMPSON,
A. O. KIRSCHNER.